(12) United States Patent
Döring

(10) Patent No.: US 11,104,423 B2
(45) Date of Patent: Aug. 31, 2021

(54) WING FOR AN AIRCRAFT

(71) Applicant: Airbus Operations GmbH, Hamburg (DE)

(72) Inventor: Dietmar Döring, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 337 days.

(21) Appl. No.: 16/209,244

(22) Filed: Dec. 4, 2018

(65) Prior Publication Data

US 2019/0168863 A1 Jun. 6, 2019

(30) Foreign Application Priority Data

Dec. 6, 2017 (DE) ...................... 10 2017 129 055.9

(51) Int. Cl.
| | |
|---|---|
| *B64C 23/06* | (2006.01) |
| *B64C 3/56* | (2006.01) |
| *B64C 13/00* | (2006.01) |
| *B64C 9/16* | (2006.01) |
| *B64C 9/22* | (2006.01) |
| *B64C 13/38* | (2006.01) |

(52) U.S. Cl.
CPC .............. *B64C 23/072* (2017.05); *B64C 3/56* (2013.01); *B64C 9/16* (2013.01); *B64C 9/22* (2013.01); *B64C 13/00* (2013.01); *B64C 13/38* (2013.01)

(58) Field of Classification Search
CPC ............ B64C 23/072; B64C 9/12; B64C 9/04
See application file for complete search history.

(56) References Cited

U.S. PATENT DOCUMENTS 4,180,222 A * 12/1979 Thornburg ................ B64C 9/06
244/225
5,100,081 A   3/1992 Thomas
(Continued)

FOREIGN PATENT DOCUMENTS

DE      603 11 659      11/2007
DE    10 2010 047 512      4/2012
(Continued)

OTHER PUBLICATIONS

Search Report cited in Register No. RU2018142915/11(071602) with translation complted May 14, 2020, 4 pages.
(Continued)

*Primary Examiner* — Richard R. Green
*Assistant Examiner* — Madison Elizabeth Dittner
(74) *Attorney, Agent, or Firm* — Nixon & Vanderhye P.C.

(57) ABSTRACT

A wing (5) for an aircraft (1) and include a fixed wing (7), a high lift system (9) including a high lift surface (27) movably mounted to the fixed wing (7), and a high lift actuation system (29) for moving the high lift surface (27) relative to the fixed wing (7) between a retracted position and at least one deployed position, a foldable wing tip portion (11) mounted to the fixed wing (7) pivotally about an axis of rotation (35) between an extended position and a folded position, a tip actuation unit (13) for moving the foldable wing tip portion (11) between the extended position and the folded position. The object to provide a simple, (Continued)

cost-efficient and light-weight wing, is achieved in that the high lift actuation system (29) is drivingly coupled to the tip actuation unit (13) to provide power to the tip actuation unit (13)

19 Claims, 2 Drawing Sheets

(56) References Cited

U.S. PATENT DOCUMENTS

| | | | |
|---|---|---|---|
| 6,345,790 B1 | 2/2002 | Brix | |
| 6,824,099 B1 * | 11/2004 | Jones | B64C 13/28 |
| | | | 244/99.12 |
| 7,494,094 B2 * | 2/2009 | Good | B64C 9/14 |
| | | | 244/215 |
| 9,296,475 B2 * | 3/2016 | Moser | B64C 9/12 |
| 9,623,960 B2 * | 4/2017 | Devenyi | B64C 23/072 |
| 9,688,418 B2 * | 6/2017 | Neb | B64C 9/20 |
| 9,840,320 B2 * | 12/2017 | Fevergeon | B64C 9/04 |
| 10,179,643 B2 * | 1/2019 | Nfonguem | B64C 13/36 |
| 2004/0000619 A1 | 1/2004 | Barriety | |
| 2005/0133672 A1 | 6/2005 | Irving et al. | |
| 2009/0200431 A1 | 8/2009 | Konings et al. | |
| 2013/0099060 A1 | 4/2013 | Dees et al. | |
| 2013/0341467 A1 | 12/2013 | Sakurai et al. | |
| 2014/0138480 A1 | 5/2014 | Richter | |
| 2017/0023031 A1 | 1/2017 | Wildman | |

FOREIGN PATENT DOCUMENTS

| | | |
|---|---|---|
| EP | 1375342 | 1/2004 |
| EP | 1 531 126 | 5/2005 |
| EP | 2 881 322 | 6/2015 |
| EP | 3 190 043 | 7/2017 |
| EP | 3 335 985 | 6/2018 |
| GB | 2 282 996 | 4/1995 |
| RU | 2013142688 | 3/2015 |
| WO | 2017/118832 | 7/2017 |
| WO | 2018/007010 | 1/2018 |

OTHER PUBLICATIONS

European Search Report cited in EP 18 208 797.3 dated Apr. 16, 2020,. 6 pages.
European Search Report cited in EP 18208797.3 dated Mar. 28, 2019, 11 pages.
John H. Wykes, "XB-70 Structural Mode Control System Design and Performance Analyses", National Aeronautics Space Administration, Jul. 1970, 164 pages.
Search Report for DE10 2017 129 055.9, dated Oct. 11, 2018, 6 pages.

* cited by examiner

WING FOR AN AIRCRAFT

RELATED APPLICATION

This application claims priority to German Patent Application DE 10 2017 129 055.9 filed Dec. 6, 2017, the entirety of which is incorporated by reference.

FIELD OF THE INVENTION

The present invention relates to a wing for an aircraft, in particular to a wing including a foldable wing tip portion. A further aspect of the present invention relates to an aircraft including such a wing.

BACKGROUND

Foldable wings include a fixed wing and a foldable wing tip portion mounted to the fixed wing in a foldable manner, such as pivotable upwards, sideway or rearward, To be folded upwards, the foldable wing tip portion may pivot about an axis extending in a horizontal plane and/or parallel to a wing chord direction and/or parallel to a wing surface and/or a flight direction. To be folded sideways, the foldable wing tip portion may pivot about a vertical axis and/or about an axis parallel to a wing thickness direction and/or about an axis normal to a plane spanned by a wing chord direction and a wing span direction.

Foldable wings reduce the span of the aircraft while on the ground and thus allow an aircraft to operate in airports which have limitations on the span of aircraft. The span of an aircraft with foldable wings is greatest during flight while the foldable wing tip portions are locked in an extended position. After the aircraft lands, the foldable wing tip portions are folded upwards or rearwards to reduce the wing span of the aircraft. The wing span is the distance from one outer end of one wing to the outer end of the other wing.

A foldable wing typically includes a fixed wing, a high lift system, a foldable wing tip portion, and a tip actuation unit. The span of the fixed wing extends between a root end at the fuselage of the aircraft and a tip end. The chord of the fixed wing extends between a leading edge and a trailing edge of the fixed wing.

The high lift system includes a high lift surface(s), and a high lift actuation system. The high lift surface(s) is movably mounted to the fixed wing, such as at the leading edge or trailing edge of the wing. The high lift actuation system is configured for moving the high lift surface relative to the fixed wing between a retracted position and at least one deployed position, such as a partly deployed position and a fully deployed position. The high lift actuation system may include actuators, wherein one or more actuators are employed to move each high lift surface.

The foldable wing tip portion is mounted to the tip end of the fixed wing and pivots about an axis of rotation between an extended position, i.e., the flight position, and a folded position, i.e. the ground position. In the extended position, the foldable wing tip portion extends in the wing span direction as an extension of the fixed wing. In the folded position the foldable wing tip portion is folded away and extends under an angle with respect to the wing span direction. The axis of rotation may extend in a wing chord direction or in a wing thickness direction.

The tip actuation unit is configured for actuating movement of the foldable wing tip portion between the extended position and the folded position. The tip actuation unit might comprise a linear actuator and/or a rotating actuator.

The tip actuation unit of a foldable wing may include a motor, such as an electric and/or hydraulic motor, and a gear box. The motor of the tip actuation unit adds additional cost and weight to the wing and to the entire aircraft.

SUMMARY

A high lift actuation system has been invented and is disclosed herein that may be embodied as a simple, cost-efficient and light-weight system in a wing.

The high lift actuation system may be drivingly coupled to a tip actuation unit to provide power to the tip actuation unit. In particular, the tip actuation unit may be driven by a motor or other power unit in the high lift actuation system. Because it is driven by the high lift actuation system, the tip actuation unit does not require its own motor or power unit. Driving the tip actuation unit with a motor of the high lift actuation system avoids the need for a separate motor for the tip actuation unit and thereby reduces the cost and weight of the tip actuation unit.

The high lift actuation system may include a rotating transmission shaft coupled to the tip actuation unit to provide rotational power to the tip actuation unit. The transmission shaft might extend over a long distance along span of the wing and might provide rotational power to the actuators of the high lift actuation system as well as to the tip actuation unit. The transmission shaft might include one or more gear parts between two or more shaft sections.

A transmission shaft coupled to the tip actuation unit and to a clutch may engage and disengage rotational power transmission between the transmission shaft and the tip actuation unit. Decoupling the tip actuation unit from the transmission shaft may be needed while the high lift surface is to be actuated while the foldable wing tip portion is not actuated.

A control unit may be configured to control the clutch to switch the coupling between the transmission shaft and the tip actuation unit between a coupled mode and in a decoupled mode. In the coupled mode, the transmission shaft transmits rotational power to the tip actuation unit in addition to transferring rotational power to the actuators of the high lift actuation system. In the decoupled mode, the transmission shaft does not deliver rotational power to the tip actuation unit while rotational power is transferred to the actuators of the high lift actuation system.

The transmission shaft may be coupled to the tip actuation unit via a gear unit. The gear unit is arranged between the transmission shaft and the tip actuation unit, such as between the clutch and the tip actuation unit. The gear unit may form part of the tip actuation unit. With the gear unit torque and speed from the transmission shaft is adapted to the requirements of the tip actuation unit.

The transmission shaft may be coupled to the tip actuation unit via a tip actuation shaft. The transmission shaft need not be coupled directly to the tip actuation unit and may be coupled via another shaft to the tip actuation shaft.

The tip actuation shaft may be coupled at a first end to the transmission shaft via the clutch and at an opposite second end to the tip actuation unit via the gear unit. This provides a flexible and efficient an arrangement.

The high lift system may include a leading edge high lift system, wherein the high lift surface is formed as a slat, a Krueger flap or a droop nose. The transmission shaft may extend along the leading edge of the wing and be drivingly coupled to one or more slat actuators for moving the slat, flap or nose. Existing leading edge high lift systems usually employ a rotating transmission shaft for driving the actuators. This transmission shaft may be used as the transmission shaft for driving the tip actuation unit.

The high lift system may be a trailing edge high lift system, wherein the high lift surface includes a flap. The transmission shaft may extend along the trailing edge of the wing and is drivingly coupled to one or more flap actuators for moving the flap. Existing trailing edge high lift systems usually employ a rotating transmission shaft for driving the actuators. This transmission shaft may be used as the transmission shaft to drive the tip actuation unit.

The wing may include an arresting unit for locking the foldable wing tip portion in the extended position and/or in the folded position. The high lift actuation system may be drivingly coupled to the arresting unit via the transmission shaft to provide rotational power to the arresting unit. Thus, the arresting unit can be driven by the high lift actuation system and no separate motor or power unit is needed for the arresting unit or the tip actuation unit.

The power unit in the high lift actuation system that is used to drive the transmission shaft may include a central power unit that drives the transmission shafts on both wings of the aircraft. Thus, an entire leading edge high lift system and/or trailing edge high lift system may be driven by the central power unit. The power unit might include an electric and/or hydraulic motor. This central power unit may also be used to provide power to operate the tip actuation units.

The invention may be embodied as an aircraft comprising a wing according to any of afore-described embodiments. The features, embodiments and effects described before in connection with the wing apply vis-à-vis to the aircraft.

SUMMARY OF DRAWINGS

An embodiment of the present invention is described hereinafter in more detail by means of a drawing. The drawing shows in.

DETAILED DESCRIPTION

Figure 1:
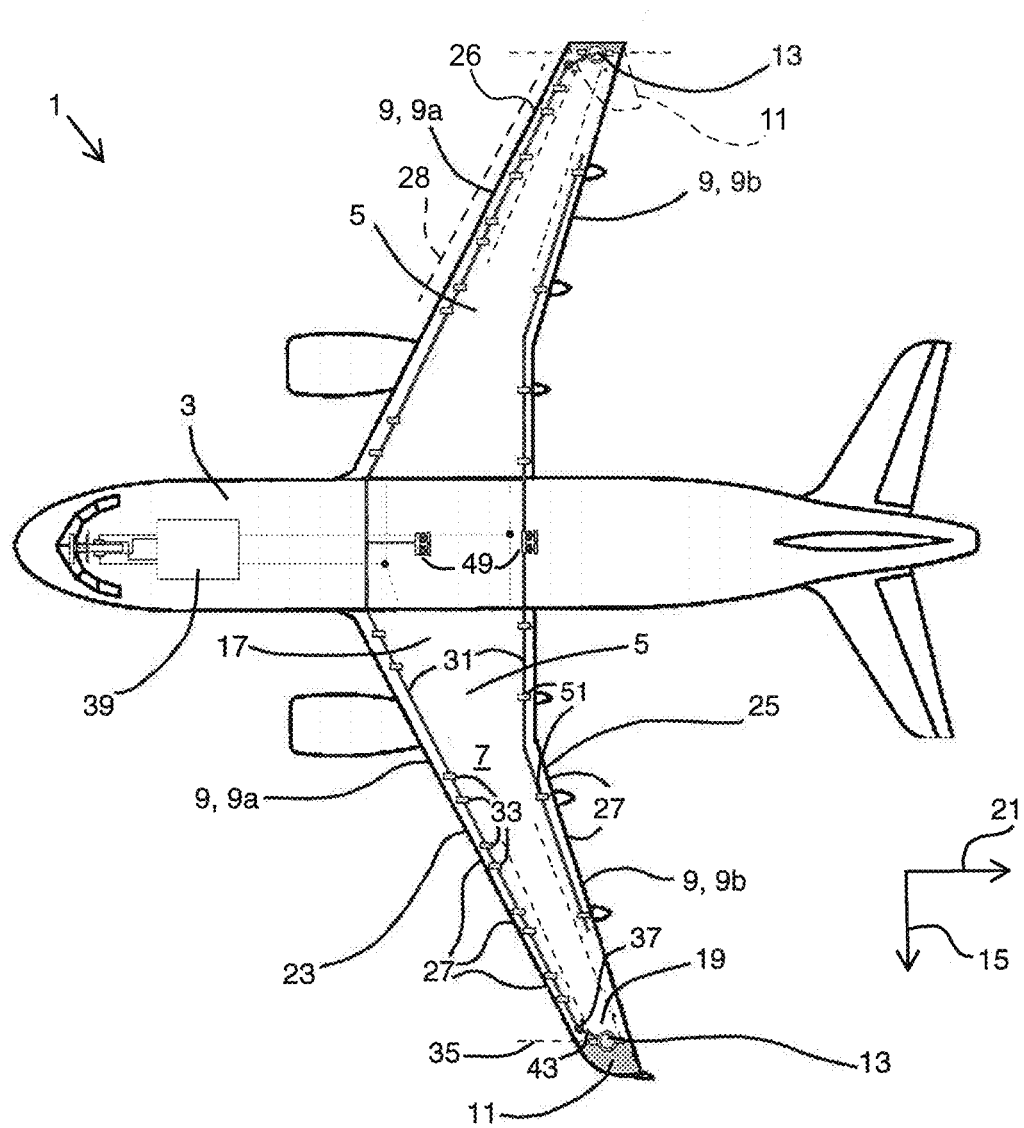
FIG. 1 is a schematic top view of an aircraft comprising wings according to the invention.
Figure 2:
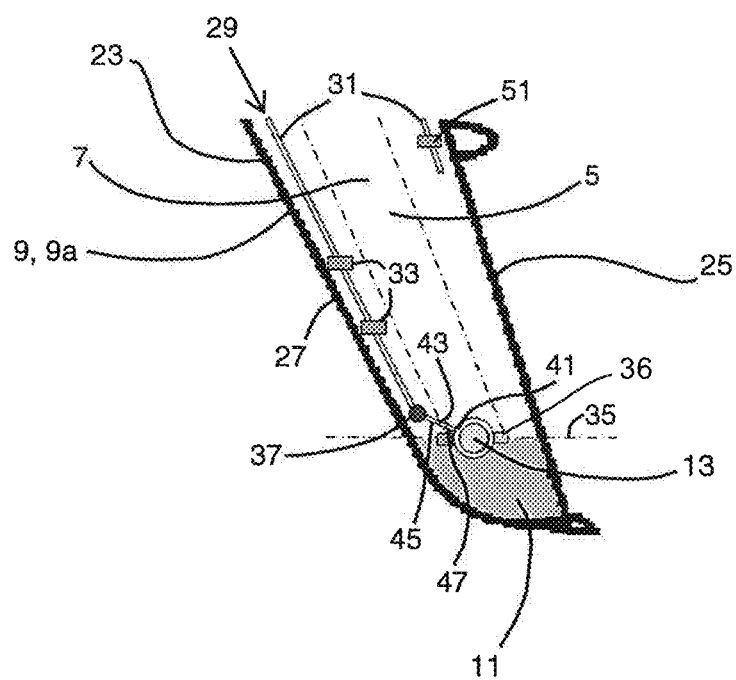
FIG. 2 is a detailed view of a foldable wing tip portion of the wing shown in FIG. 1.

FIG. 1 shows an aircraft 1 according to an embodiment of the invention. The aircraft 1 includes a fuselage 3 and wings 5 mounted to the fuselage 3. Each wing 5 includes a fixed wing 7, a high lift system 9, a foldable wing tip portion 11, and a tip actuation unit 13. The fixed wing 7 extends in a wing span direction 15 between a root end 17 (at or near the fuselage 3) and a tip end 19. Also, the fixed wing extends in a wing chord direction 21 between a leading edge 23 and a trailing edge 25 of the fixed wing.

The high lift system 9 includes a plurality of high lift surfaces 27, and a high lift actuation system 29. In the present embodiment, the high lift system 9 is formed as a leading edge high lift system 9a, wherein the high lift surfaces 27 are formed as slats. Each high lift surface 27 is movably mounted to the fixed wing 7, specifically at the leading edge 23. The high lift actuation system 29 is configured for moving the high lift surface 27 relative to the fixed wing 7 between a retracted position 26 and at least one deployed position 28 (illustrated by dotted lines). The high lift actuation system 29 comprises a rotating transmission shaft 31 and a plurality of slat actuators 33, wherein the transmission shaft extends along the leading edge 23 of the fixed wing 7 and is drivingly coupled to the slat actuators 33 for moving the slats, i.e. the high lift surfaces 27.

The foldable wing tip portion 11 is mounted to the tip end 19 of the fixed wing 7 pivotally about an axis of rotation 35 between an extended position and a folded position. In the extended position the foldable wing tip portion 11 extends in the wing span direction 15 as an extension of the fixed wing 7. In the folded position the foldable wing tip portion 11 is folded away (see dotted wing tip portion in the upper half of FIG. 1) and extends under an angle with respect to the wing span direction 15. The axis of rotation 35 in the present embodiment extends in the wing chord direction 21. The tip actuation unit 13 is configured for actuating movement of the foldable wing tip portion 11 between the extended position and the folded position. An arresting unit 36 locks the foldable wing tip portion in the extended position and/or in the folded position. The high lift actuation system may be drivingly coupled to the arresting unit via the transmission shaft to provide rotational power to the arresting unit. Thus, the arresting unit can be driven by the high lift actuation system and no separate motor or power unit is needed for the arresting unit or the tip actuation unit.

The high lift actuation system 29, specifically the transmission shaft 31, is drivingly coupled to the tip actuation unit 13 to provide rotational power to the tip actuation unit 13. Thus, the transmission shaft 31 provides rotational power to the slat actuators 33 of the high lift actuation system 29 as well as to the tip actuation unit 13.

The transmission shaft 31 is coupled to the tip actuation unit 13 via a clutch 37 configured for coupling and decoupling rotational power transmission between the transmission shaft 31 and the tip actuation unit 13. A control unit 39 is provided configured for controlling the clutch 37 to operate in a coupled mode and in a decoupled mode. In the coupled mode the transmission shaft 31 transmits rotational power to the tip actuation unit 13 in addition to the rotational power transferred to the slat actuators 33 of the high lift actuation system 29. In the decoupled mode rotational power transmission between the transmission shaft 31 and the tip actuation unit 13 is interrupted so that rotational power is transferred only to the slat actuators 33 of the high lift actuation system 29.

The transmission shaft 31 is coupled to the tip actuation unit 13 via a gear unit 41 and a tip actuation shaft 43. The gear unit is arranged between the clutch 37 and the tip actuation unit 13. The tip actuation shaft 43 is coupled with a first end 45 to the transmission shaft 31 via the clutch 37 and is coupled with an opposite second end 47 to the tip actuation unit 13 via the gear unit 41.

A central power unit 49 is provided for driving the transmission shafts 31 on both wings 5 of the aircraft 1. The power unit 49 includes electric and/or hydraulic motors.

In addition to the leading edge high lift system 9a, the aircraft 1 further includes a trailing edge high lift system 9b. Similar to the leading edge high lift system 9a the trailing edge high lift system 9b comprises a high lift actuation system 29 and a plurality of high lift surfaces 27 formed as flaps. The high lift actuation system 29 comprises a rotating transmission shaft 31 and a plurality of flap actuators 51 coupled to the transmission shaft 31. The transmission shaft 31 is driven by a central power unit 49. In the present embodiment, the trailing edge high lift system 9b is not drivingly coupled to the tip actuation unit 13, as the leading edge high lift system 9a is. However, in other embodiments, the trailing edge high lift system 9b might be drivingly coupled to the tip actuation unit 13 instead of or in addition to the leading edge high lift system 9a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A wing for an aircraft comprising
a fixed wing,
a high lift system including a high lift surface movably mounted to the fixed wing and a high lift actuation system configured to move the high lift surface relative to the fixed wing between a retracted position and at least one deployed position,
a foldable wing tip portion mounted to the fixed wing and configured to pivot about an axis between an extended position for flight operations and a folded position for ground operations of the foldable wing tip portion, wherein a span of the wing while the foldable wing tip portion is in the folded position is shorter than the span of the wing while the foldable wing tip portion is in the extended position and the aircraft is on the ground, and
a tip actuation unit configured to move the foldable wing tip portion between the extended position and the folded position,
wherein the high lift actuation system is drivingly coupled to the tip actuation unit to power to the tip actuation unit.

2. The wing according to claim 1, wherein the high lift actuation system comprises a rotating transmission shaft coupled to the tip actuation unit to provide rotational power to the tip actuation unit.

3. The wing according to claim 2, wherein the transmission shaft is coupled to the tip actuation unit via a clutch configured to decouple rotary power transmission from the transmission shaft to the tip actuation unit.

4. The wing according to claim 3, wherein a control unit is configured to control the clutch to operate in a coupled mode which transmits rotational power from the transmission shaft to the tip actuation unit, and a decoupled mode in which rotational power is not transmitted from the transmission shaft to the tip actuation unit.

5. The wing according to claim 2, wherein the transmission shaft is coupled to the tip actuation unit via a gear unit.

6. The wing according to claim 2, wherein the transmission shaft is coupled to the tip actuation unit via a tip actuation shaft.

7. The wing according to claim 6, wherein the tip actuation shaft is coupled to the transmission shaft via a clutch, and is coupled to the tip actuation unit via a gear unit.

8. The wing according to claim 2, wherein a power unit is provided for driving the transmission shaft.

9. The wing according to claim 1, wherein the high lift system is a leading edge high lift system, wherein the high lift surface is formed as a slat.

10. The wing according to claim 9, wherein a transmission shaft extends along a leading edge of the wing and is drivingly coupled to one or more slat actuators for moving the slat.

11. The wing according to claim 1, wherein the high lift system is a trailing edge high lift system, wherein the high lift surface is formed as a flap.

12. The wing according to claim 11, wherein a transmission shaft extends along a trailing edge of the wing and is drivingly coupled to one or more flap actuators configured to move the flap.

13. The wing according to claim 1, wherein the wing further includes an arresting unit configured to lock the foldable wing tip portion in the extended position and/or in the folded position, and wherein the high lift actuation system is drivingly coupled to the arresting unit to provide power to the arresting unit.

14. A wing of an aircraft including:
a fixed wing;
a high lift system including a high lift surface movably mounted to the fixed wing and a transmission shaft coupled to the high lift surface, wherein the transmission shaft extends in a span-wise direction along the fixed wing and the transmission shaft moves the high lift surface relative to the fixed wing in a chord-wise direction between a retracted position and at least one deployed position of the high lift surface,
a foldable wing tip portion mounted to a tip of the fixed wing and configured to pivot with respect to the fixed wing between an extended position for flight operations and a folded position for ground operations of the foldable wing tip portion, wherein a span of the wing while the foldable wing tip portion is in the folded position is shorter than the span of the wing while the foldable wing tip portion is in the extended position and the aircraft is on the ground, and
a tip actuation unit configured to move the foldable wing tip portion between the extended position and the folded position,
wherein the transmission shaft is drivingly coupled to the tip actuation unit to power to the tip actuation unit to move the foldable wing tip portion.

15. The wing according to claim 14, further comprising a clutch coupling the transmission shaft to the tip actuation unit.

16. The wing according to claim 15, wherein the tip actuation unit includes a tip actuation shaft having a first end coupled to the clutch and a second end extending towards the foldable wing tip portion.

17. The wing according to claim 14, wherein the high lift surface is at a leading edge of the fixed wing and the transmission shaft is proximate the leading edge.

18. The wing according to claim 14, wherein the transmission shaft extends at least to a root of the fixed wing.

19. The wing according to claim 18, wherein the transmission shaft is coupled to a central power unit in a fuselage of the aircraft.

* * * * *